United States Patent [19]

Kuze

[11] 4,177,377

[45] Dec. 4, 1979

[54] SEQUENCE CONTROL SYSTEM

[76] Inventor: Yoshikazu Kuze, No. 31-3, Higashi Magome 1-chome, Ota-ku, Japan

[21] Appl. No.: 931,552

[22] Filed: Aug. 7, 1978

[51] Int. Cl.$^2$ .................... G06K 7/14; G06K 19/06; H04B 1/06

[52] U.S. Cl. ........................... 235/419; 235/466; 235/494; 325/395

[58] Field of Search .............. 235/419, 454, 487, 494, 235/466; 200/46; 179/100.11; 358/127; 325/395, 396

[56] References Cited

U.S. PATENT DOCUMENTS

| | | | |
|---|---|---|---|
| 2,930,941 | 3/1960 | Neidenberg et al. | 200/46 |
| 3,030,015 | 4/1962 | Wieslander et al. | 200/46 |
| 3,066,863 | 12/1962 | Wilson | 200/46 |
| 3,072,238 | 1/1963 | Chan | 200/46 |
| 3,158,419 | 11/1964 | Meyer et al. | 200/46 |
| 3,243,532 | 3/1966 | De Bonduwe | 200/46 |
| 3,308,378 | 3/1967 | Murray | 200/46 |
| 3,315,044 | 4/1967 | Newsome et al. | 200/46 |
| 3,961,162 | 6/1976 | Wells | 200/46 |
| 4,102,492 | 7/1978 | Gold et al. | 200/46 |

*Primary Examiner*—Daryl W. Cook
*Attorney, Agent, or Firm*—Thomas R. Morrison

[57] ABSTRACT

A sequence control system comprising a transparent program sheet bearing a series of write clock marks and a plurality of data lines and arranged in the longitudinal direction of the sheet; a sheet reader having photo-electric switching means. The program sheet is inserted into the sequence controller from one side until it reaches a positioning index, then the sequence controller being ready for write cycle. While the sheet is pulling out from the other side, the write clock marks generate write clock pulses and then the data will be sequentially written into a memory in synchroniztion with the write clock. After the program sheet has been extracted, a read ready state is automatically established. To read the data, cycle time is determined and a start switch is turned on, then the data being delivered from outputs of the memory in synchronization with the read clock pulse.

24 Claims, 22 Drawing Figures

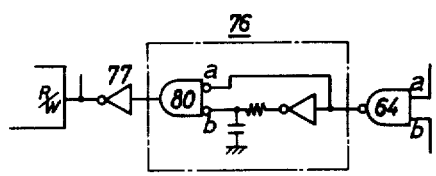
FIG.9
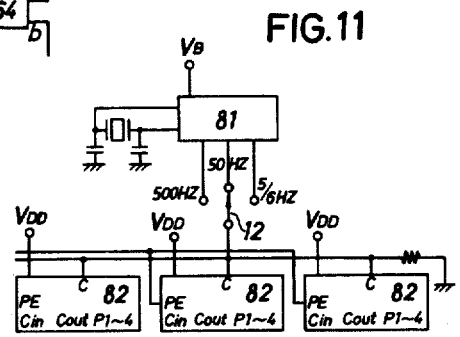
FIG.11
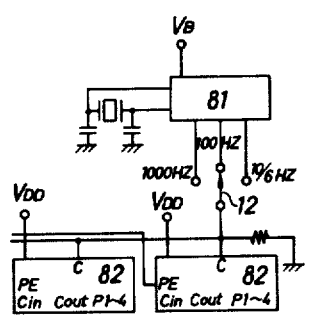
FIG.10
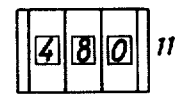
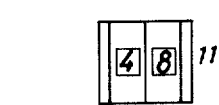
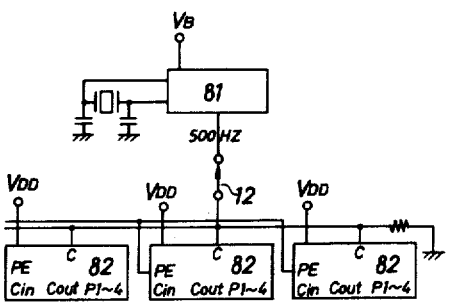
FIG.12

SEQUENCE CONTROL SYSTEM

BACKGROUND OF THE INVENTION

The present invention relates to a sequence controller particularly applicable for automatic control of various machines.

There are various kinds of sequence controllers such as a rotary cam drum system, a diode-matrix system, a computer system, etc. However, data programmings and modifications in these systems are so complicated that it is very difficult for ordinary persons to do such programmings and modifications. Therefore, the programmings and modifications in the foregoing systems have been conducted by persons skilled in this technical field.

For the sake of eliminating greatly the complicated programmings and modifications of the conventional art, the present invention has been achieved.

SUMMARY OF THE INVENTION

Accordingly, it is an object of the present invention to provide a sequence controller in which data programmings and modifications are very simple and easy for anybody having no special technical knowledge, consequently secrets of the programming and modification being maintained.

It is another object of the present invention to provide a sequence controller which is simply operable to write in and read out the data.

It is a further object of the present invention to provide a sequence controller which is of high fidelity, structured compactly and manufactured at an inexpensive cost.

A sequence control system comprises a transparent program sheet bearing a series of write clock marks and a plurality of data lines which are formed by any means such as adhesive attachment of opaque material and arranged in the longitudinal direction of the sheet.

A sheet reading device comprises means for passing the sheet along a path, a plurality of light-emitting elements disposed in the lateral direction at the entrace of the path.

A plurality of light-receiving elements each of which faces one of the light-emitting elements and is arranged to generate data when the light from the corresponding light-emitting elements is interrupted by the write clock marks and the data lines of the sheet.

Memory means are provided to memorize the data in synchronization with the write clock marks through a counter. And the data are generated from the memory means in synchronization with the read clock pulses.

A transparent program sheet, A R/W line and the write clock marks are printed with opaque ink, while the graduated scales are printed with non-opaque ink synchronization with the write clock marks.

An adhesive opaque tape is cut in each length of each step of the resulting time chart and attached onto the graduated scales to match scales of the transparent program sheet in accordance with a predetermined time chart.

The sequence controller as described above allows a simple procedure of cutting and attaching opaque tape onto the transparent program sheet, and hence initial programming as well as modification of the program for any control sequence is extremely simple and easy.

The program sheet is inserted into the sequence controller from one side until it reaches a positioning index, then the sequence controller being ready for write cycle. While the sheet is pulling out from the other side, the clock marks generate write clock pulses whereby the data will be sequentially written into a memory in synchronization with the write clock pulses.

After the program sheet has been extracted, a read ready state is automatically established.

To read the data, a cycle time is determined and a start switch is turned on, then the data being delivered from outputs of the memory in synchronization with the read clock pulse.

Any cycle time may be obtained by increasing or decreasing frequency dividing outputs, number of contacts of the selector switch and number of digit of a preset code switch in cooperation with the intended number of write clock pulses.

A power-failure protective circuit is provided with the power-failure detection circuit in order to avoid the unexpected damage or confusion which may happen particularly at the time when the power-failure has been recovered.

These and other objects, features, and advantages of the present invention will be readily apparent from the following description and appended claims taken in conjunction with the accompanying drawings.

BRIEF DESCRIPTION OF THE DRAWINGS

FIG. 9 shows a circuit diagram of a one-shot pulse generating circuit;

FIG. 10 shows an embodiment of a write timing pulse generater;

FIG. 11 shows a second embodiment of the write timing pulse generater;

FIG. 12 shows another embodiment of the write timing pulse generater;

DETAILED DESCRIPTION OF THE INVENTION

Figure 1:
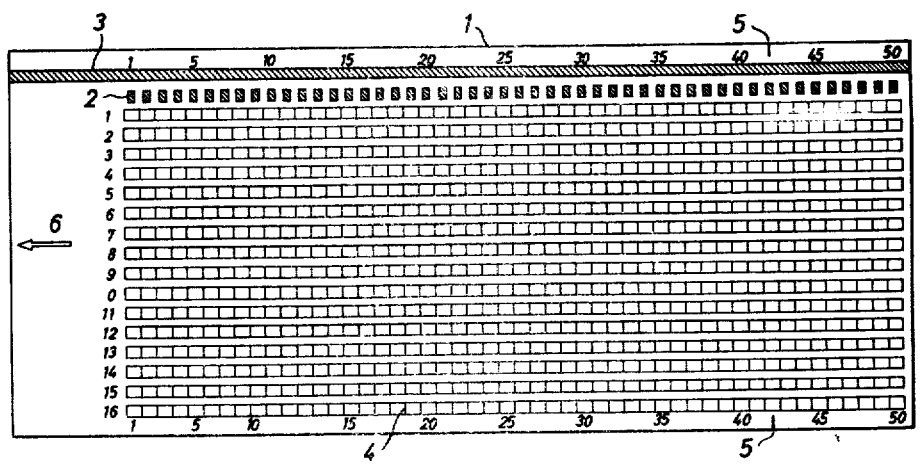
FIG. 1 shows a transparent program sheet of a sequence controller according to the present invention.
Figure 2:
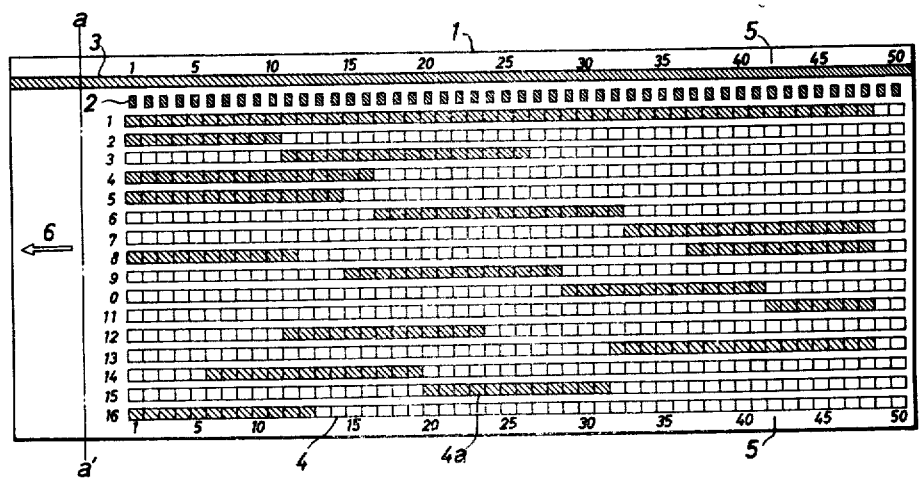
FIG. 2 shows a time chart attached an opaque tape onto the transparent program sheet.

Referring now to FIG. 1, there is shown a typical transparent program sheet 1 on which are printed a write clock marks 2 and a R/W opaque line 3. Both the clock pulses 2 and the R/W line 3 are printed in opaque ink on the program sheet 1. Numeral 4 designates data write graduation lines printed in non-opaque ink and which are in synchronization with the clock marks. By attaching opaque tapes over the graduated scales, time charts are formed in parallel as shown in FIG. 2. As shown in FIG. 1, the graduated scales 4 are extending amid the two successive clock marks 2, which aim to prevent any erroneous counting of the data pulses. Numeral 5 is a positioning index as an aid in inserting the program sheet 1 into the sequence controller, and numeral 6 is an arrow marking which indicates the direction of inserting the program sheet 1.

Typically, the write clock marks 2 are fifty in number, and the data having sixteen steps are disposed on the program sheet 1 in parallel with each other.

FIG. 2 shows an example of a program sheet carrying sixteen steps time chart made by attaching adhesive opaque tapes on the surface of the transparent program sheet 1 according to the predetermined arrangement. The chain line a–a' indicates the position of a photoelectric switching line, which will be described hereinafter, when the program sheet 1 is inserted into the sequence controller until the positioning index 5.

Figure 3:
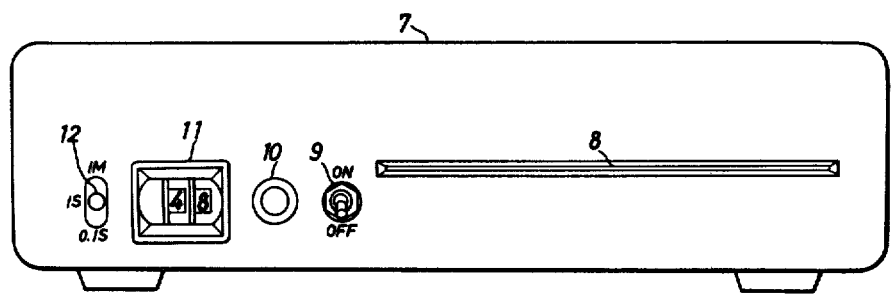
FIG. 3 shows a front view of the sequence controller.

FIG. 3 is a front view of the sequence controller according to the present invention. Numeral 7 is a front panel, numeral 8 is a program sheet extracting slot, numeral 9 is a 1-cycle/repetition cycle selector switch, numeral 10 is a start switch, and numeral 11 is a preset code switch having a 2-digit figure which indicates a sequence cycle time. Numeral 12 is a 3-position selector switch.

Figure 4:
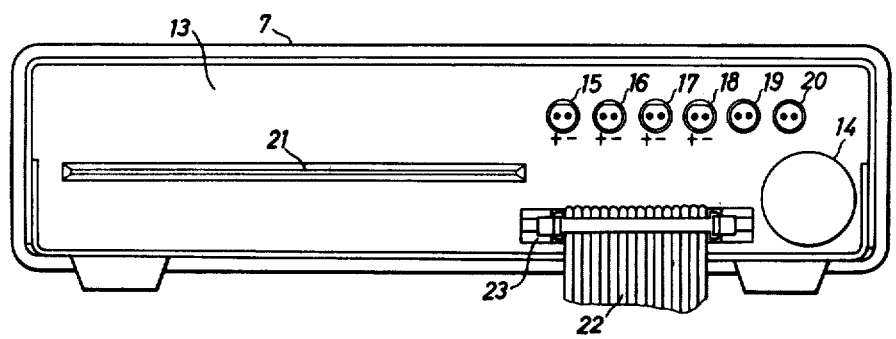
FIG. 4 shows a back view of the sequence controller.

FIG. 4 is a back view of one embodiment of sequence controller according to the present invention. Numerals 13, 14 show a back panel and a battery cassette case respectively. Numerals 15 and 16 are abnormality detection connectors, numerals 17, 18 are extension connectors, numeral 19 is a connector for a remote-controlling stop switch, numeral 20 is a connector for a remote-controlling start switch, numeral 21 is a program sheet introducing slot, numeral 22 is a ribbon cable, and numeral 23 is a connector.

Figure 5:
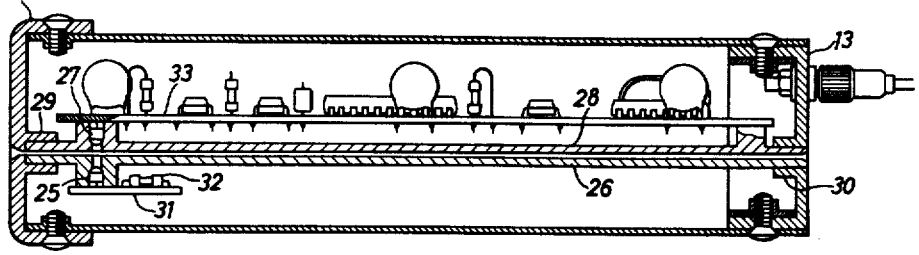
FIG. 5 shows a transverse cross-sectional view of the sequence controller.

In FIG. 5 there is shown a sheet reader which includes a light emitting panel 26 provided with a plurality of light-emitting elements 25 disposed inside the panel 26, and a light-receiving panel 28 provided with a plurality of light-receiving elements 27 disposed inside the panel 28.

The panels 26 and 28 are arranged so as to face to each other and spigot-jointed with a gap through which the program sheet 1 is passed. (See FIG. 8). The panels 26, 28 thus spigot-jointed are fitted and retained between guide frames 29, 30 formed on the front panel 7 and rear panel 13 respectively.

The light-emitting panel 26 is fixed thereon with a circuit board 31 to which resistors are connected so as to limit the current to the light-emitting element 25. Further, the light-receiving panel 28 is fixed thereon with a circuit board 33 to which memories, an oscillator, integrating circuits, capacitors, resistors, etc are connected.

Figure 6:
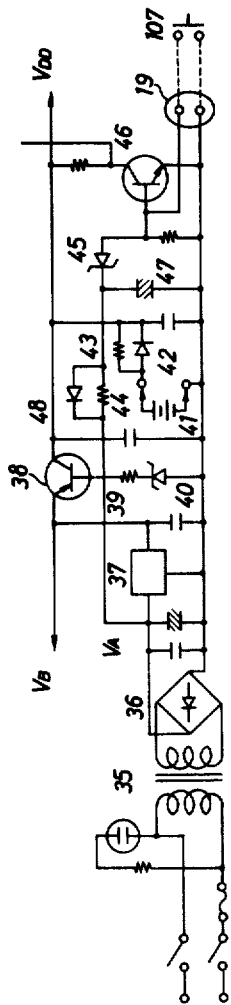
FIG. 6 shows a circuit diagram of a power system.

FIG. 6 is a power circuit.

A system power $V_B$ is obtained through a transformer 35, a rectifier circuit 36 and a constant-voltage regulator 37. With the power circuit closed, current flows through an emitter of pnp transistor 38, a resistor 39 and a zenor diode 40 to the earth. Thus, the transistor 38 turns on to supply $V_{DD}$ to memory system. While the power is cut off, the transistor 38 turns off so that the voltage from a battery 41 is supplied through a diode 42 to the memory system to keep the contents of the memory.

As a battery back-up for the memory circuit, a lithium or alkali battery of high energy density may be utilized. Otherwise, a rechargeable Ni-cd battery may be used. In case where such Ni-cd battery is used, a resistor 43 will be connected in parallel to the diode 42. In case of a lithium or alkali battery being used, the resistor 43 is to be removed.

Now a power failure detector circuit as shown in FIG. 6 will be described. The input $V_A$ of the constant-voltage regulator 37 is connected to the base of a transistor 46 through a resistor 44 and a zenor diode 45. With the power circuit closed, the transistor 46 turns on, delivering an output "o." While the power is cut off, however, the transistor 46 turns off, delivering an output "1."

It will be noted that at the moment when the power circuit is closed, the transistor 46 should turn on after $V_B$ and $V_{DD}$. For this purpose, a capacitor 47 is provided. Namely, when the power is closed, the transistor 46 will turn on after the power $V_B$ and $V_{DD}$, because the capacitor 47 is charged. When the power is cut off, the potential charged in the capacitor 47 is released through a diode 48.

Figure 7:
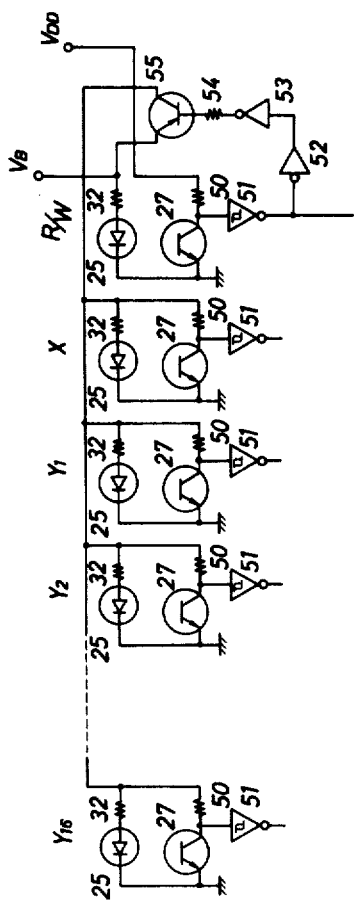
FIG. 7 shows a circuit diagram of a photo-electric switching array.

FIG. 7 shows a photo-electric conversion switching array including the light emitting diodes 25 and the photo-transistors 27. The sum of eighteen sets of the photo-electric switching circuits are disposed in a line, including one set for the R/W line, one set for the write clock pulse line (x), and sixteen sets for data line $Y_1$, $Y_2$, $Y_3$ ... $Y_{16}$.

First, the photo-electric switching circuit for R/W line will be described. A series circuit having the light emitting diode 25 and resistor 32 is connected between the system power source $V_B$ and the earth, while a series circuit having the photo-transistor 27 and a resistor 50 is connected between the memory power source $V_{DD}$ and the earth. The light-emitting diode 25 and the photo-transistor 27 are secured to face to each other. When the light from the light-emitting diode 25 is projected onto the photo-transistor 27, the photo-transistor 27 will turn on, of which the output will be "0". On the contrary, when the light from the light-emitting diode 25 is interrupted, the photo-transistor 27 turns off, of which the output will be "1". The output from the photo-transistor is fed to a schmitt trigger circuit 51 where any noise is eliminated and the signal is formed into a sharp square pulse.

Since the illumination of the light-emitting diode 25 consumes very much electric power, such an arrangement is madt at the time when a writing cycle is over, so that the system power $V_B$ is cut off to a X-line and Y-line photoelectric switching array.

During the write cycle, the R/W opaque line 3 interrupts light from the light-emitting diode 25, so that no light is projected onto the photo-transistor 27 whereby the output of the photo-transistor 27 is changed to "1." A pnp transistor 55 is turned on through the schmitt trigger circuit 51 inverters 52, 53 and a resistor 54, thus the system power $V_B$ being able to be fed to the X-line and Y-line circuit groups. When the program sheet is extracted, the light from the light-emitting diode 25 is projected onto the photo-transistor 27. Accordingly, the pnp transistor 55 will be turned off. Thus, the system power $V_B$ to the X-line and Y-line circuit groups is cut off.

Figure 8:
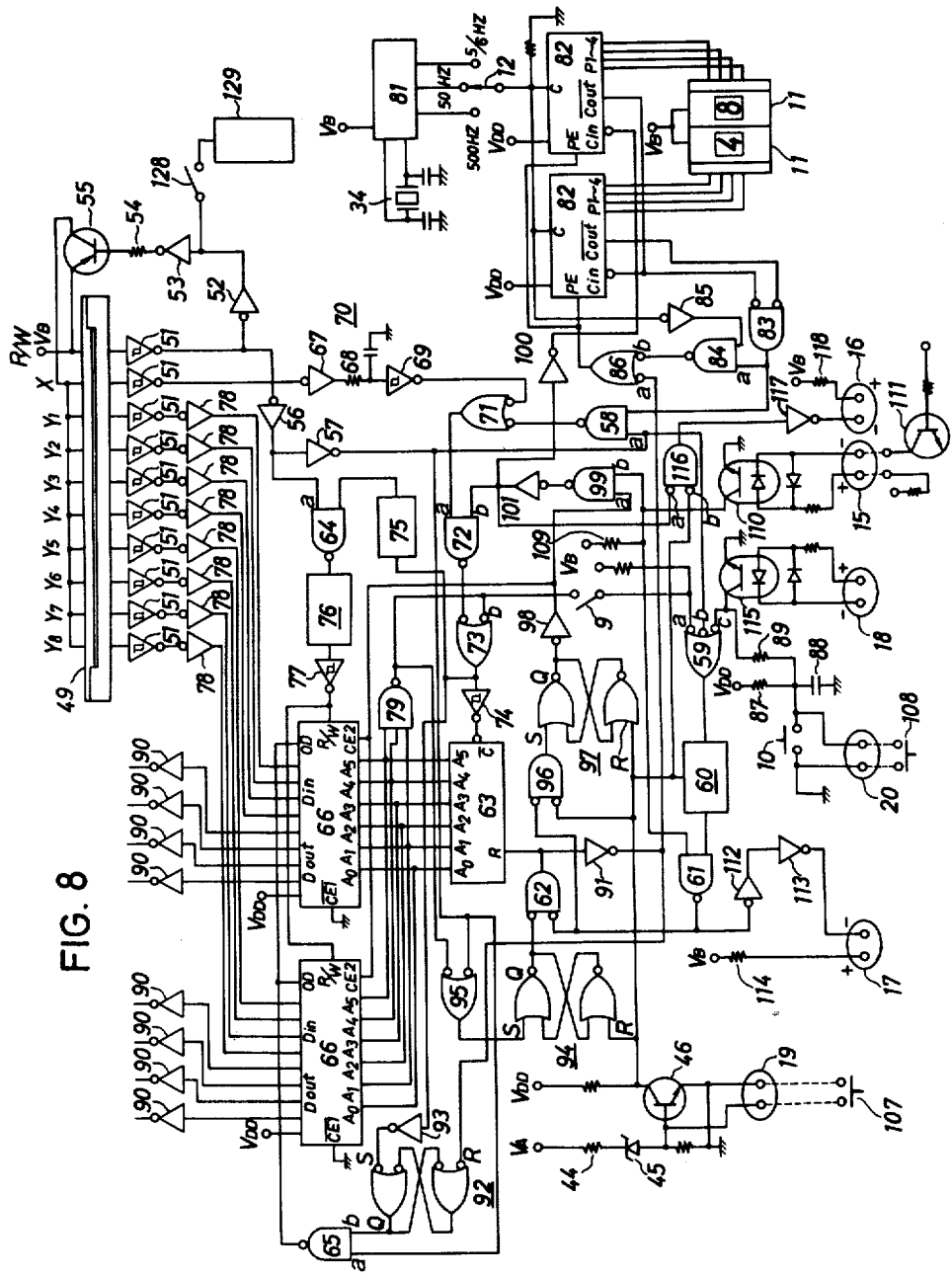
FIG. 8 shows a circuit diagram of one embodiment of the present invention.

FIG. 8 is a circuit diagram of one embodiment of the sequence controller according to the present invention. During the write cycle, the program sheet 1 is inserted into the sequence controller until it reaches the positioning index 5. Then the light from the light-emitting diode 25 corresponding to the R/W opaque line 3 is interrupted, so that the output of the photo-transistor 27 will be "1." This output "1" is delivered "0" through the schmitt trigger circuit 51 and inverter 56, 57 to a input of a 2-input NAND gate 58, so that the gate 58 is closed. Further, the "0" pulse applied to b-input of 3-input NAND gate 59 to cause, as described later, a one-shot pulse generating circuit 60 to generate "1" trigger pulse which will be fed through a 2-input NAND gate 61 and 2-input NOR gate 62 to a reset terminal R of a binary counter 63 which in turn will be cleared. The a-input of the 2-input NAND gate 64 is changed to "1," so that this gate is opened. Further, a "1" signal is supplied to the a-input of a 2-input NAND gate 65 and during data writing, the output disable terminal OD of the C-MOS RAM 66 is changed to "1" to set the data output bus line Dout in a high impedance state, for therey interrupting the data bus line D out and open the data input bus line Din.

When the R/W opaque line 3 interrupts the light from the corresponding light-emitting diode 25 in the above-mentioned manner, the sequence controller is ready for writing of data.

Next to this, while the program sheet 1 is being extracted, the write clock pulses of the X-line fed through the schmitt trigger circuit 51, an invertor 67 to a delay circuit 70 comprising CR integrated circuit 68 and a schmitt trigger circuit 69 to eliminate any chattering noises from the write clock pulses, and further fed through 2-input NAND gates 71, 72, 73 and a schmitt trigger circuit 74 to the binary counter 63 along a clock line $\overline{C}$ thereof to sequentially appoint a memory cell of the C-MOS RAM 66 through address lines $A_0$, $A_1$, $A_2$, . . . $A_5$. The output from the 2-input NAND gate 73 is applied further through a delay circuit 75, 2-input NAND gate 64, one-shot pulse generating circuit 76 and a schmitt trigger circuit 77 to the R/W terminal of the C-MOS RAM 66.

As a result, with the R/W input command in synchronization with the write clock pulse, data sequentially written into the address cells of the memory 66.

When the binary counter 63 counts fifty write clock pulses, the output of a 3-input NAND gate 79 becomes "0." Since the binary expression of fifty numbers is "110010," the signal levels on the address lines $A_1$, $A_4$, and $A_5$ are "1," when fifty clock pulses are counted up. Accordingly, b-input of the 2-input NAND gate 73 becomes "0" level. Thus, this NAND gate is closed to terminate the data writing.

When the program sheet is extracted, a read ready state is automatically established. Namely, because the program sheet 1 is absent, the light from the light-emitting diode 25 of the R/W photo-electric switching circuit is projected onto the photo-transistor 27. Then, the output of the photo-transistor 27 becomes "0." Accordingly, a-input of the 2-input NAND gate 64 which controls the clock pulses to the R/W terminals of C-MOS RAM 66 becomes "0," with the result 2-input NAND gate 64 is closed.

The one-shot pulse generating circuit 76 has a circuit configuration as shown in FIG. 9. The output of the 2-input NAND gate 64 is changed to "1" when the a-input thereof becomes "0." Thus, a-input of a 2-input NOR gate 80 becomes "1" while the output thereof is always "0." The output of the NOR gate 80 is supplied through the schmitt trigger circuit 77 to fix the R/W input to "1" during the read cycle. Also, the output of the 2-input NAND gate 65 is changed to "0" as to be described hereinafter. Thus, the OD of the C-MOS RAM 66 to "0" during the read cycle, to close the data input bus line Din while to open the data output bus line Dout. Further, the signal "1" is supplied to the a-input of the 2-input NAND gate 58 which controls the read clock pulse, to open this gate for the read clock pulses to be permitted to pass there.

The read clock pulses will be provided through quartz oscillator 34 and frequency divider 81. In FIG. 10 there is shown a combination of a 3-pin selector switch 12, a BCD down counter 82 and the two digit preset code switches 11. The frequency divider 81 provides outputs of 500, 50 and 5/6 Hz. Any one of these frequencies can be selected through the selector switch 12.

In order to deliver fifty pulses, which is as many as the write clock marks, it takes 0.1 sec. with 500 Hz; 1 sec with 50 Hz; and 1 min. with 5/6 Hz. By setting the preset code switches 11 to, for example, "48" as illustrate while selecting 500 Hz through the selector switch 12, the read cycle time will be 4.8 second. With 50 Hz selected, the cycle time will be 48 seconds, while with 5/6 Hz selected, it will be 48 minutes.

Since each digit of the preset code switch can be varied from 0 to 9, the sum of 297 kinds of such cycle times may be provided.

Here, any output of the frequency divider 81 of 500, 50 or 5/6 Hz is selected by the selector switch 12 supplied to the clock lines C to two BCD down counters 82, and the reset lines $P_1$, $P_2$, $P_3$, $P_4$ are connected to the BCD lines of the two corresponding preset code switches 11. It is assumed that the preset code switch 11 is set to, for example, "48."

Each time when one clock pulse enters a down counter 82, the content thereof will be decreased by 1. When the content of the down counter 82 reaches 0, the tenth position changes from 4 to 3 and ones position from 0 to 9. When both the two digits of the down counter 82 count out to 0 in this way, namely, when the down counter 82 has received 48 (forty-eight) clock pulses, both a two inputs of a 2-input NOR gate 83 become "0," delivering one read clock pulse. Further, the two inputs of the NAND gate 84 become "1" with the negative going edge of the clock pulse through the selector switch 12 and a invertor 85, and this 2-input NAND gate 84 delivers "0" to a 2-input NAND gate 86, so that the output of this gate 86 becomes "1." As a result, the preset enable terminal PE of the down counter 82 is supplied with "1" to permit writing of a preset value "48" into the BCD down counter 82 by the preset code switch 11.

Each time when 48 clock pulses are supplied to the BCD down counter 82 through the selector switch 12, the 2-input NOR gate 83 delivers one read clock pulse at the output thereof. With 50 write clock pulses sent out, one cycle is over.

By increasing or decreasing the frequency dividing output, the number of contact of the selector switch 12 and the number of digits of the preset code switch 11 in cooperation with the predetermined number of the write clock pulses, any cycle time may be obtained as described.

FIG. 10 shows an example in which frequency dividing output of 1000, 100, 10/6 Hz for the 100 write clock pulses, a cycle time in unit of 0.1 sec, one sec and one minute is assured. This figure shows a 48-sec cycle time.

FIG. 11 shows another example in which frequency dividing output of 500, 50, 5/6 Hz for the 50 write clock pulses, a cycle time in unit of 0.1 sec, one sec. and one minute is assured. This figure shows a 480 seconds cycle time.

FIG. 12 shows a still another example in which frequency dividing output of 500 Hz for the 50 write clock pulses, a cycle time in unit of 1 sec is assured. This figure shows 480 seconds cycle time.

To read the data, first the switch 9 is set to "one cycle" (OFF) side, the cycle time is determined and the start switch 10 is turned ON. Then, the chattering noise is removed through a filter circuit consisting of a resistor 87 and capacitor 88. The 3-input NAND gate 59 receives at C input thereof "0" through a resistor 89. Consequently, "1" one shot trigger pulse develops in the one-shot pulse generating circuit 60, the trigger pulse being applied through the 2-input NAND gate 61 and the 2-input NOR gate 62 to the reset terminal R of the binary counter 63 clears the latter to zero. Then, the next first read clock pulse passes through the 2-input NAND gate 58, 71, 72, 73 and the schmitt trigger circuit 74 to the binary counter 63. The binary counter 63 starts counting, addressing successively the memory cells in the C-MOS RAM 66. With a read command, the data is delivered through an inverter buffer 90 from the output bus line Dout.

When the binary counter 63 counts the fifty read clock pulses, the output of the 3-input NAND gate 79 is changed to "0." Accordingly, the 2-input NAND gate 73 which controls the clock pulses to the binary counter 63 closes the gate so that the delivery of data is stopped upon completion of one cycle.

After making sure that each job is executed correctly, the changeover switch 9 is set to repeat side (ON). Then, the a-input of the b 3-input NAND gate 59 becomes "0" and "1" trigger pulse occurs in the one-shot pulse generating circuit 60. The "1" trigger pulse is applied to the reset terminal R of the binary counter 63 to clear the latter. Consequently, the output of the 3-input NAND gate 79 is changed to "1" so that the b-input of the 2-input NAND gate 73 is changed to "1" level, thus the latter gate being opened. Further, the "1" trigger pulse which clears the binary counter 63 passes through an inverter 91 to apply "0" to the a-input of the 2-input NAND gate 86. Thus, the output of the 2-input NAND gate 86 becomes "1" to apply "1" to the preset enable (PE) terminal of the down counter 82 which in turn will be preset. The setting "48" by the preset code switch 11 is written into the down counter which will start counting. The read clock pulses delivered from the down counter 82 pass through the 2-input NAND gate 73 to the output of the binary counter 63, addressing successively the memory cells in the C-MOS RAM 66. With read commands R/W, CE and OD, the data is delivered through the inverter buffer 90 from the output bus line Dout. Thereafter, the above-mentioned operation is repeated. It will be noted that the binary counter 63 is always cleared with priority to the down counter 82.

Assuming here that a "1" trigger pulse is applied to the reset terminal R of the binary counter 63, this counter is cleared to "0." The "0" signals will inadvantageously be delivered from all the data bus lines at that time. To avoid this, it is necessary that after the binary counter 63 is cleared, the OD terminal of C-MOS RAM should be held at "1" level to stop the delivery of the data until the next first read clock pulse is supplied. To this end, a flip-flop 92 is provided a S input of which is connected to the output side of the 2-input NAND gate 73 through an inverter 93, while a R input is connected to the reset terminal R of the binary counter 63 through the inverter 91.

Figure 13:
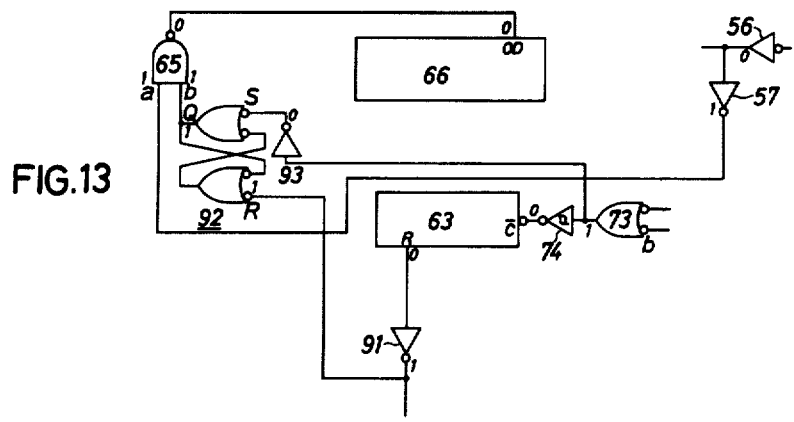
FIGS. 13 and 14 show each a partial explanation diagrams of the FIG. 8.

As illustrated in FIG. 13, when the output of the 2-input NAND gate 73 is at "1" level, the output Q of the flip-flop 92 is "1". Since the a input of the 2-input NAND gate 65 is fixed to "1" during the read cycle, the output of the 2-input NAND gate 65 becomes "0."

Figure 14:
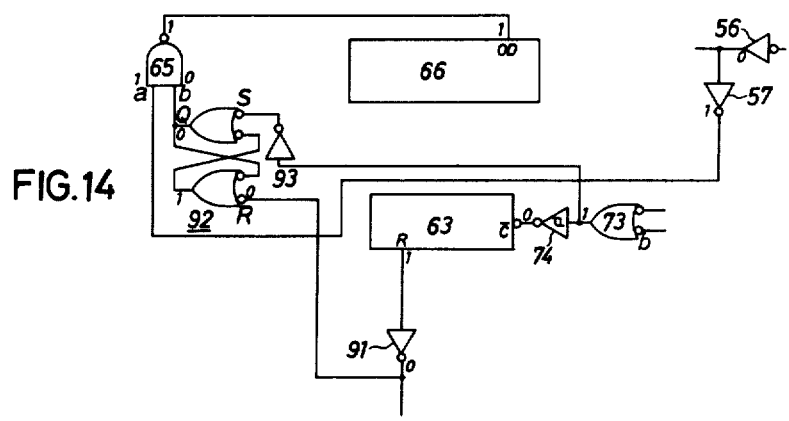

Since the output Q of the flip-flop 92 will not change even if the output of the 2-input NAND gate 73 changes to "0." When the binary counter 63 counts fifty read clock pulses, however, the "1" trigger pulse is applied to the reset terminal R of the binary counter 63 to clear the count. At the same time, the output of the 2-input NAND gate 65 will change to "1" to cause the OD of the C-MOS RAM to change to "1" so as to interrupt the delivery of data (FIG. 14). With the first read clock pulse, the output of the 2-input NAND gate 65 will be "0" as shown in FIG. 13.

In this way, each time when the binary counter has counted the fifty read clock pulses, the count is cleared to zero, the OD of C-MOS RAM is made "1" to interrupt the delivery of data.

Figure 15:
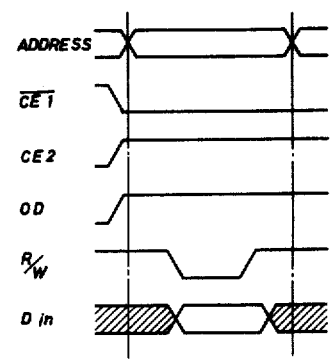
FIG. 15 shows a timing diagram of a write cycle.
Figure 16:
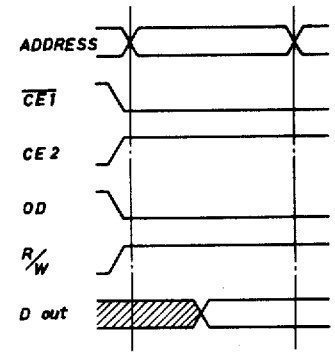
FIG. 16 shows a timing diagram of a read cycle.

FIG. 15 illustrates the writing cycle of the C-MOS RAM 66, and FIG. 16 shows the reading cycle thereof.

The power-failure detection circuit according to the present invention will be described as follows.

The output of this power-failure detection circuit is connected to the R input of a first flip-flop 94 composed of a 2-input NOR gate, while the 3-input NAND gate 79 is connected at the output thereof to a S input through a 2-input NAND gate 95. The output Q and the output of the 2-input NAND gate 61 are connected to the reset terminal R of the binary counter 63 through the NOR gate 62. The output of the power-failure detection circuit and the 2-input NAND gate 61 are connected to a 2-input NOR fate 96, the output of which is connected to a S input of a second flip-flop 97 composed of a 2-input NOR gates, while the output of the power-failure detection circuit is connected to a R input.

The output Q of the second flip-flop 97 is connected, on one hand, through an inverter 98 to the chip enable terminal $CE_2$ of the C-MOS RAM 66, and on the other hand, through a-input of a 2-input NAND gate 99 as well as through an inverter 101 and 100 to the carry in terminal Cin of the down counter 82.

When any power-failure is detected by the power-failure detection circuit, the output thereof will be "1" so the R input of the first flip-flop 94 is "1," and consequently, the output Q will be "1." Even when the R input returns to "0" after the power failure is recovered, the output Q will continue to be "1." The R input of the second flip-flop 97 will be "1" so that the output Q thereof will be "1" to apply "0" signal through the inverter 98 to the a-input of the 2-input NAND gate 99.

The output of this gate 99 will be "1" so as to apply "0" signal through an inverter 101 to the b-input of the 2-input NAND gate 72. Thus, this gate 72 is closed to interrupt the delivery of clock pulses. Since the $CE_2$ input of the C-MOS RAM 66 changes to "0," to stop the delievery of the data output. The "1" signal through the inverter 100 is applied to the terminal Cin of the down counter 82 to cause this counter to stop counting. It should be noted that even when the power failure is recovered, the status is held.

By making sure that the power failure has been recovered, the start switch 10 is turned on. The C-input of the 3-input NAND gate 51 becomes "0," and the one-shot pulse generating circuit 60 delivers the "1" trigger pulse. Through the 2-input NAND gate 61 the "0" trigger pulse is input to the 2-input NOR gate 62. However, during the power failure and while the power is being recovered, another input of the 2-input NAND gate 62 is "1" and the output thereof is "0," so that the binary counter 63 is not cleared. Since the 2-input of the 2-input NOR gate 96 becomes "0" and the S input of the second flip-flop 97 becomes "1," the output "Q" is changed to "0." Accordingly, the 2-inputs of the 2-input NAND gate 99 are "1" (the b-input becomes "1" by being pulled by the $V_{DD}$ through the resistor 109). The output "0" thereof delivers "1" to the b-input of the 2-input NAND gate 72 through the inverter 101. Accordingly, the gate of the 2-input NAND gate 72 is opened. Further, counting is started by delivering "0" to Cin of the down counter 82 through the inverter 100. On the other hand, since $CE_2$ becomes "1," the data is placed at the output state.

Then, the binary counter 63 resumes to count the clock pulses in the cycle remainer when the power supply was suspended, and delivers the data correspondingly. When the entire cycle is completed, the output of the 3-input NAND gate 79 becomes "0" so that the output Q of the first flip-flop 94 changes to "0." On the other hand, the "0" output of the 3-input NAND gate 79 is applied through the switch 9 and the 3-input NAND gate 59 to the one-shot pulse generating circuit 60 to produce "1" trigger pulses. Both the two inputs of the 2-input NOR gate 62 become "0," so that the "1" output from the latter is applied to the binary counter to clear it to "0." Thereafter, the data will continuously be delivered in synchronization with the read clock pulses.

Figure 17:
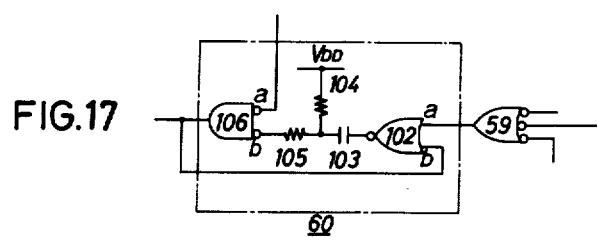
FIG. 17 shows a second circuit diagram of a one-shot pulse generating circuit.

The one-shot pulse generating circuit 60 is described in more detail in FIG. 17. The output of the 3-input NAND gate 59 is connected to a-input of a 2-input NOR gate 102, the output of which is connected through an integrated circuit composed of a capacitor 103 and a resistor 104 to $V_{DD}$, and through a resistor 105 to a b-input of a 2-input NOR gate 106.

The a-input of the 2-input NOR gate 106 is connected to the output of the power failure detector circuit. The b-input of the 2-input NOR gate 106 is "1" as pulled up by the resistor 104, so that the output thereof is "0." When the "0" signal is supplied to the input of the 3-input NAND gate 59, the 2-input NOR gate 102 delivers "0," so that both the 2-inputs of the 2-input NOR gate 102 are "0," the output of the latter being changed to "1." Since the capacitor 103 is increasingly charged, the b-input to the 2-input NOR gate 106 becomes "1" so that the output thereof being rendered to "0."

When a power failure occurs, the a-input to the 2-input NOR gate 106 becomes "1" so that the output thereof will be "0" irrespectively of the level of the b-input thereof. Accordingly, the output of the 2-input NOR gate 62 will be "0," thus resulting in no clearing of the binary counter 63.

The remote control circuit will now be described. The base and an emitter of the npn transistor 46 are connected to the connector 19 as illustrated in FIG. 8. The connector 19 is further connected to an external stop switch 107. The start switch 10 has connected at both electrodes thereof to the connector 20 which is connected an external start switch 108.

When the external stop switch 107 is turned on, the output from the transistor 46 becomes "1," which causes the data delivery to be stopped as in the case of the power failure. If the stop switch 107 is off, the above status is held.

By turning on the external start switch 108, data delivery is started as in the case of turning on the start switch 10.

An emergency stop circuit will be now described. A collector of a photo-transistor in a photo-coupler 110 is pulled up through a resistor 109 to the $V_b$ while an emmitter of the photo-transistor 110 is being grounded. A light-emitting diode of the photo-coupler 110 is connected to the connector 15 as shown. This connector 15 is further connected to a connector of an external abnormality detector.

When the external abnormality detector detects any abnormality, a npn transistor 111 turns to its on state, so that the photo-coupler 110 also turns to the on state. Consequently, the b-input to the 2-input NAND 99 becomes "0," the output thereof being "1." The 2-input NAND gate 72 received "0" through the inverter 101, and is closed to interrupt read clock pulses, thus stopping the data delivery.

Figure 18:
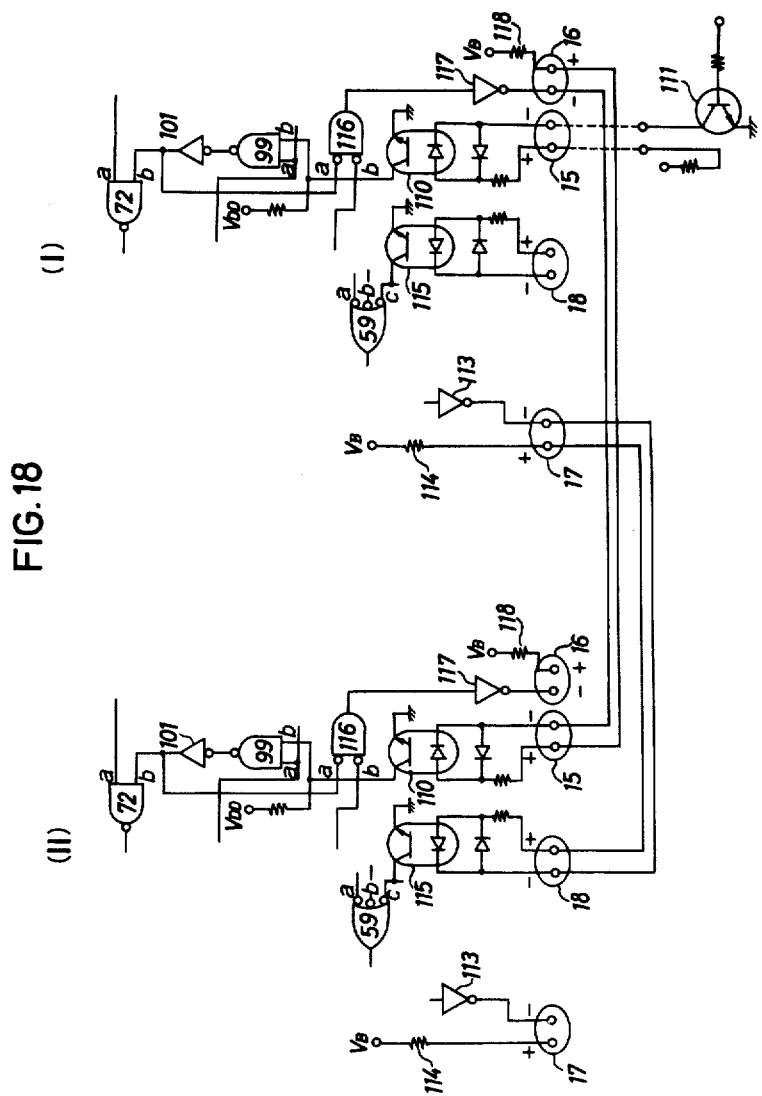
FIG. 18 shows a circuit diagram in case two sequence controllers are used in combination.

When it is intended to extend the number of the steps is obtained by connecting together a plurality of sequence controllers. The output line of the one-shot pulse generating circuit 60 in one sequence controller (I) (FIG. 18) is connected through the inverters 113 and the negative (−) side of a connector 17 to a negative side of a connector 18 of the other sequence controller (II).

The system source $V_B$ is connected through a resistor 114 to a positive side (+) of the connector 17 and a positive side of the connector 18 of the other sequence controller (II) to an anode of a light-emitting diode in a photo-coupler 115, a cathode thereof being connected to a negative (−) side of the connector 18. Further, a connector of a photo-transistor of the photo-coupler 115 is connected to a c-input of the 3-input NAND gate 59, while an emitter of the photo-transistor being grounded.

When at the sequence controller (I) there is developed a trigger pulse which clears the binary counter 63, the photo-coupler 115 of the other sequence controller (II) becomes conductive (on). As the result, the c-input to the 3-input NAND gate 59 becomes "0" so that the one-shot pulse generating circuit 60 generates the "1" trigger pulse, which will clear the binary counter 63. In this way, two or three sequence controllers used in combination will deliver the data in parallel in synchronization with each other.

In case two sequence controllers are used in combination, when the external abnormality detector detects any abnormality which causes one sequence controller (I) to stop the delivery of output, the other sequence controller (II) should also stop delivering output.

For the above purpose, there is provided a 2-input NOR gate 116 which is connected at the a-input thereof to the b-input of the 2-input NAND gate 72, and the b-input thereof to the output of the power failure detector circuit. An output of the NOR gate 116 is connected through an inverter 117 to a negative side of the connector 16, a positive side of which is connected through a resistor 118 to $V_B$. Further, the connector 16 of the sequence controller (I) is connected to the connector 15 of the other sequence controller (II) as shown.

When the external abnormality detector detects any abnormality, the photo-coupler 110 of the sequence controller (I) turns on, applying "0" to the b-input of the 2-input NAND gate 72 which in turn will be closed to stop delievery of the clock pulses. The "0" input to the 2-input NAND gate 72 is also applied to the a-input of the 2-input NOR gate 116. Since the b-input of the NOR gate 116 is always "0" unless any power failure occurs, the output from the 2-input NOR gate 116 will be "1," while the output from the inverter 117 becomes "0." Consequently, the photo-coupler 110 of the other sequence controller (II) turns on, applying "0" to the b-input of the 2-input NAND gate 72 which in turn will be closed to stop the clock pulses delivery.

Then, the external abnormality detector detects any abnormality, both the sequence controllers (I) and (II) stop to deliver the data output at a same time as described above.

Figure 19:
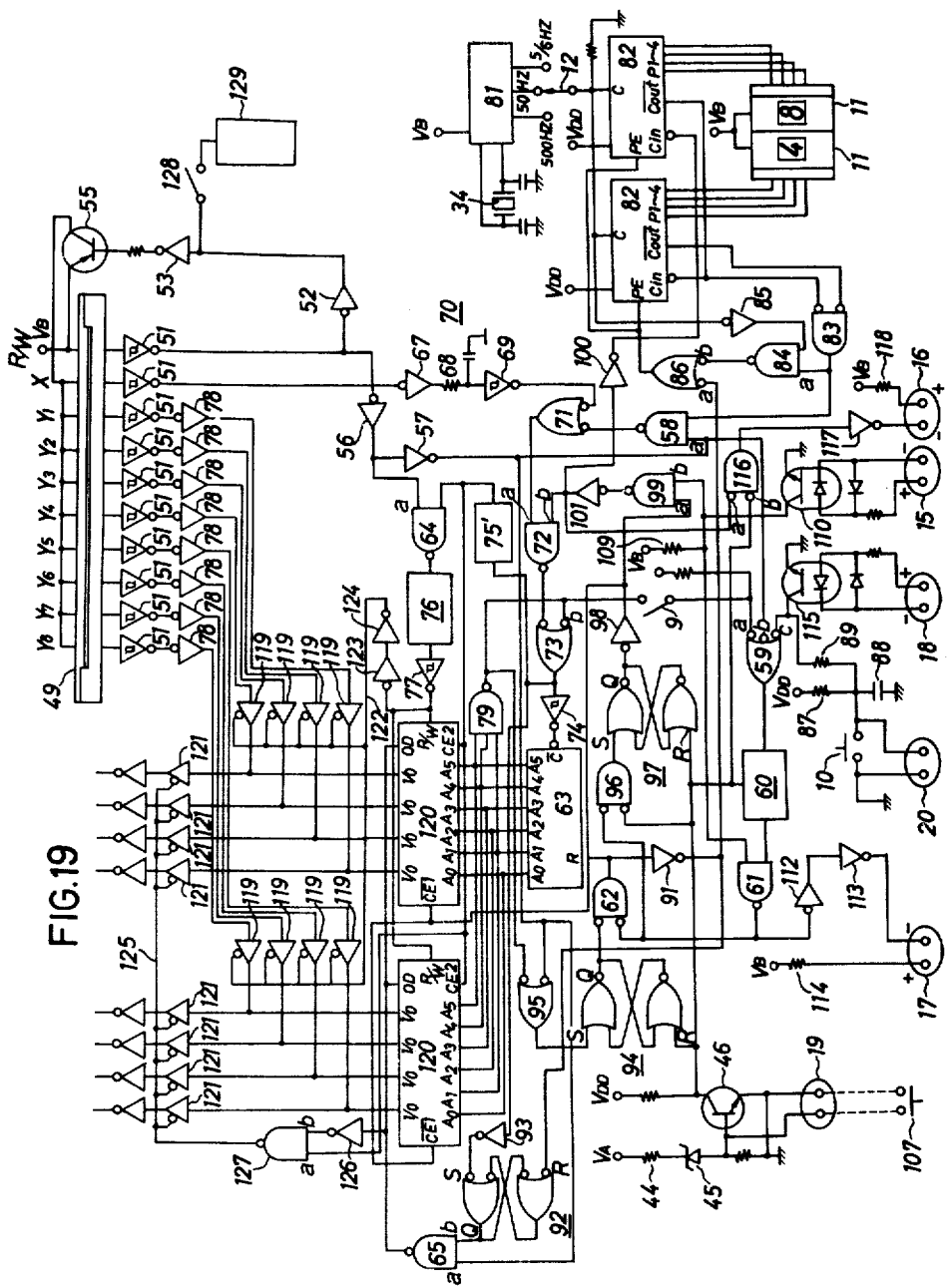
FIG. 19 shows a circuit diagram of the second embodiment of the present invention.

FIG. 8 shows the circuit diagram of one embodiment of utilized the C-MOS RAM 66 with the separated input and output bus lines, while a circuit diagram of second embodiment of a sequence controller according to the present invention utilized a C-MOS RAM with a common input and output bus lines is illustrated in FIG. 19.

Input data bus lines are connected through a 3-state buffer 119 to a output/input (1/0) of a C-MOS RAM 120, while an output data bus lines extends from an input/output (1/0) through a 3-state buffer 121. Each of the 3-state buses lines are controlled by a disable line. Namely, when the disable line is at "1," the 3-state buffer are in a high impedance state resulting electrically isolated the input and the output.

The disable line 122 of the data input lines are connected from a R/W terminal of the C-MOS RAM 120 through inverters 123 and 124 to an input of the 3-state buffer 119. Further, the disable line 125 of the data output lines are connected from an OD terminal of the C-MOS RAM 120 through an inverter 126 to the b-input of a 2-input NAND gate 127, an output of which is connected to the 3-state buffer 121. Another input a of the 2-input NAND gate 127 is connected to the chip enable terminal CE2 of the C-MOS RAM 120. However, this a-input a will be "0" when power failure occurs.

During the write cycle, the a-input of the 2-input NAND gate 65 is "0" while the output thereof is "1" and OD is "1," so that the output of the inverter 126 is "0." Accordingly, the output of the 2-input NAND gate 127 is "1," resulting in the interruption of the data output. The disable line connected to the R/W line of the C-MOS RAM 120 become in synchronization with the R/W line as delayed by two inverters 123, 124. The data is thus written with an R/W command into the memory cells appointing by the binary counter 63.

During the read cycle, the R/W line of the C-MOS RAM is fixed at "1" (FIG. 9) so that the disable line is "1." The 3-state buffer 119 are in a high impedance state to disconnect the input data bus lines. Since both the a- and b-inputs of the 2-input NAND gate 65 are "1" while the output thereof is "0" and OD is fixed at "0," further both the a- and b-inputs of the 2-input NAND gate 127 are "1" and the output thereof will be "0," so that the output data bus lines are made conductive to deliver the data in synchronization with the read clock pulses. Other circuit configuration is similar to that shown in FIG. 8, and consequently will not be further described.

Figure 20:
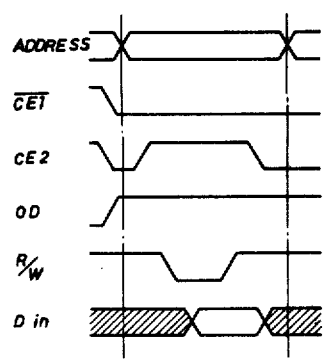
FIG. 20 shows a timing diagram of the write cycle.
Figure 21:
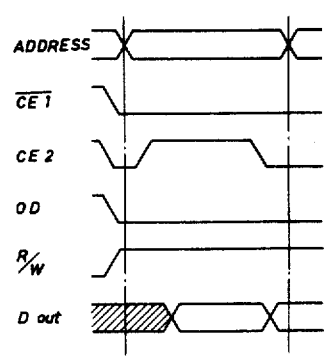
FIG. 21 shows a timing diagram of the read cycle.

FIG. 20 shows a timing diagram of the write cycle of the C-MOS RAM 120, and FIG. 21 illustrates a read cycle thereof.

FIGS. 8 and 19 show an embodiment of eight-steps sequence controller according to the present invention, which includes two C-MOS RAMs with 4-bit input and output, connected in parallel to each other. In practice, however, the sequence controller with a sixteen steps is to be used as standard version. Therefore, four C-MOS RAMs of 4-bit are connected together in parallel.

Otherwise, a compact sixteen-steps sequence controller may be built by connecting two C-MOS RAMs of 8-bits in parallel to each other or providing a C-MOS RAM of 16 bits.

As having been aforementioned, a plurality of sequence controllers may be connected together to provide an increased output. Further, the output may be expanded by increasing the number of RAMs used an consequently the number of corresponding input and output lines.

Since the program sheet 1 is designed to be short, writing of data can be effected by manually inserting and extracting the program sheet into and from the controller. Further, the program sheet may be inserted and extracted as driven by a motor.

The R/W opaque line used in the above-mentioned embodiment may be eliminated and a R/W changeover switch may be used instead. Furthermore, the C-MOS RAM also in the aforementioned embodiment according to the present invention may be replaced with a P ROM.

Figure 22:
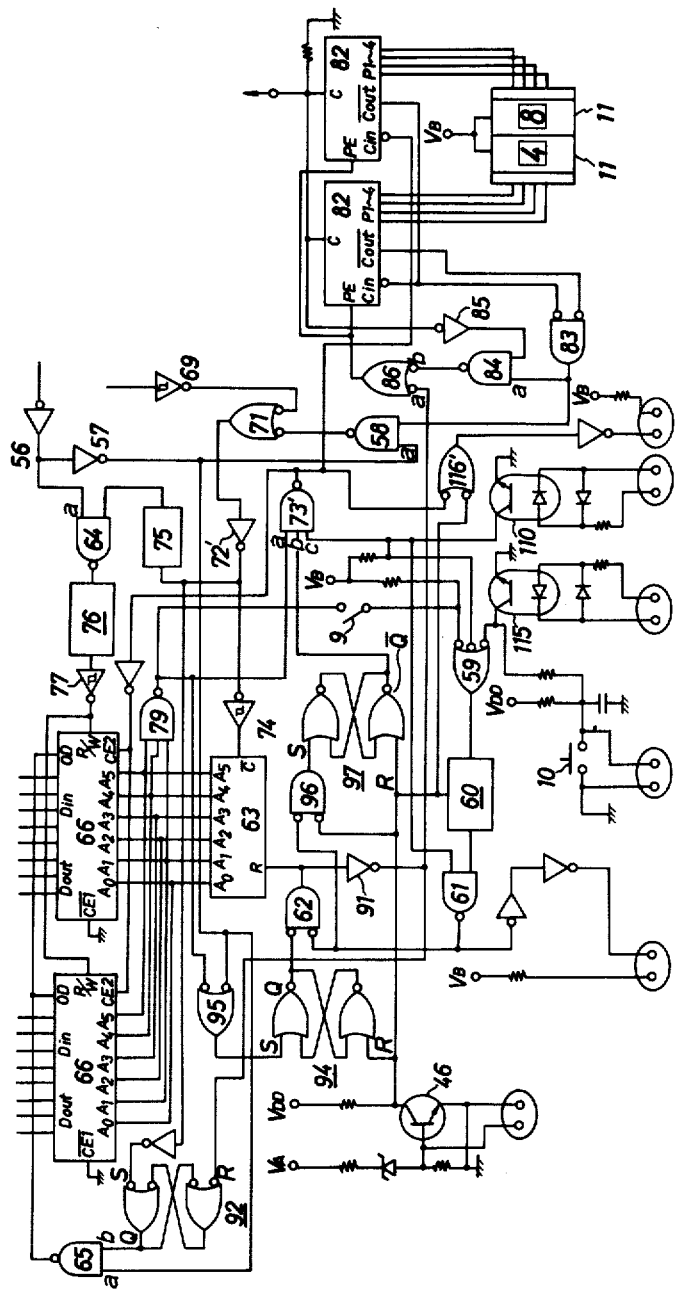
FIG. 22 shows a circuit diagram of the third embodiment of the present invention.

In the circuits illustrated in FIGS. 8 and 19, the clock pulses to the binary counter 63 are controlled as follows: the one-cycle end signal "0" from the multi-input NAND gate 79 is applied to the b-input of the 2-input NAND gate 73 by which the clock pulses are cut off. When the power failure or abnormality is detected, the signal "0" is applied to the b-input of the 2-input NAND gate 72 to cut off the clock pulses. However, the read clock pulse generator circuit produces incessantly the clock pulses except for during the power failure. For a more efficient operation of the clock pulse generator and for a less number of gates used, the present invention may be embodied as shown in FIG. 22.

To this end, the a-input of a 3-input NAND gate 73' is connected to the output of the multi-input NAND gate 79, the b and c-inputs of the gate 73' being connected to the Q output of the second flip-flop 97 and to the collector of the photo-transistor in the photo-coupler 110, respectively, while the output of said gate 73' is connected to the carry input Cin of the up/down counter.

Upon the completion of one cycle, the a-input of the multi-input NAND gate 73' becomes "0," and the output of this gate is applied to the carry input Cin of the up/down counter 82 which in turn will be caused to stop counting. Should power fail, the output $\overline{Q}$ of the second flip-flop and the b-input become "0" so that also the up/down counter will be caused to stop counting. If any abnormality is detected, the c-input of the multi-input NAND gate 73' becomes "0," thus causing the up/down counter to stop counting.

The output of the clock pulse control gate 73' may be connected through an inverter to $\overline{CE2}$, while the input $\overline{CE1}$ may be grounded. In this case, upon completion of each cycle, or upon detection of any abnormality or occurrence of the power failure, the C-MOS RAM is locked and protected from all the input and output pulses. Since the other circuit configuration of this embodiment is nearly the same as that shown in FIG. 8, no further description thereof will be made.

What is claimed is:

1. A sequence control system comprising a transparent program sheet bearing a series of write clock marks and a plurality of data lines which are formed of opaque material and arranged in the longitudinal direction of said sheet,
   a sheet reading device;
   said sheet reading device comprising;
      means for passing said sheet along a path,
      a plurality of light-emitting elements disposed in the lateral direction at the entrance of said path, and
      a plurality of light-receiving elements each of which is corresponding to each of said light-emitting elements and arranged to generate data when light from the corresponding light-emitting element is interrupted by said write clock marks and data lines of said sheet,
   memory means for memorizing said data in synchronization with said write clock marks:
   means for generating read clock pulse for reading said data;
   means including a binary counter for actuating said memory means to cause it to generate output signals in accordance with said data memorized therein in synchronization with said read clock pulse, and
   gate means for controlling said data and pulse.

2. A sequence control system according to claim 1 in which said transparent program sheet bears a plurality of graduation scales each of which scales is positioned on the lateral line passing a point between the write clock pulses.

3. A sequence control system according to claim 1 in which said transparent program sheet bears a R/W line printed with opaque ink and a plurality of graduation scales printed with non-opaque ink each of which graduation scales is positioned on the lateral line passing a point between the write clock marks.

4. A sequence control system according to claim 1 in which an output of the light-receiving element actuated by the R/W line supply a system power through a transistor to the sheet reading circuits.

5. A sequence control system according to claim 1 in which said means for generating read clock pulse includes a frequency-dividing circuit, a BCD up/down counter and a preset code switch, preset lines of the BCD up/down counter are connected to BCD lines of the preset code switch, output of the frequency-dividing circuit corresponding to the write clock marks is input to a clock line of the BCD up/down counter through a select switch, output of the BCD up/down counter is input to said binary counter of said means for actuating the memory means and also input to the preset enable terminal of the BCD up/down counter.

6. A sequence control system according to claim 5 in which said program sheet has 50 write clock marks and said frequency-dividing circuit has three outputs, 500 Hz, 50 Hz and 5/6 Hz.

7. A sequence control system according to claim 5 in which said program sheet has 100 write clock marks and said frequency-dividing circuit has three outputs, 1000 Hz, 100 Hz and 5/3 Hz.

8. A sequence control system according to claim 1 in which said gate means includes a circuit for stopping the operation at the end of one cycle which is adapted to an input terminal of a gate for controlling the read clock pulse to the binary counter.

9. A sequence control system according to claim 1 in which said gate means includes a repeat cycle circuit which is adapted to a reset terminal of the binary counter through a repeat-cycle switch and a one-shot-pulse generating circuit.

10. A sequence control system according to claim 9 in which said gate means includes a one-shot-pulse generating circuit which is so arranged that an output of a NOR gate 102 is input to a 2-input NOR gate 106 through an integration circuit and one of the inputs of the latter 2-input NOR gate is connected to an output of a power-failure circuit.

11. A sequence control system according to claim 1 in which the reset line of said binary counter is connected to the preset enable terminal of said BCD up/down counter for the reset of the binary counter prior to the reset of the BCD up/down counter.

12. A sequence control system according to claim 1 in which said gate means comprises a power failure detective circuit comprising a fixed-voltage regulator, a transistor, a first flip-flop and a second flip-flop, an input terminal of the fixed-voltage regulator is connected to a base of the transistor through a resistor and a zener diode, the output of said transistor is coupled to a R-terminal of the first flip-flop and to a R-terminal of the second flip-flop.

13. A sequence control system according to claim 1 in which said gate means comprises a power failure detective circuit, the first flip-flop, the second flip-flop, and the one-shot pulse generating circuit, the output of the power failure detective circuit is coupled to the R-terminal of the first flip-flop, an one-cycle end signal line is coupled to a S-terminal of the first flip-flop, a signal is input to the reset of the binary counter upon output of the first flip-flop being simultaneous with output of the one-shot pulse generating circuit, a signal is input to the S-terminal of the second flip-flop upon output of the power failure detective circuit being simultaneous with the output of the one-shot pulse generating circuit, output of the power failure detective is input to the R-terminal of the second flip-flop, the output of the second flip-flop is coupled to a chip-enable (CE2) of the C-MOS RAM and to a carry-in of the BCD up/down counter, whereby a power failure may be protected.

14. A sequence control system according to claim 1 in which the binary counter includes an output preventing circuit upon clear thereof comprising a third flip-flop, a S-input line of said flip-flop is connected to an output of a gate for controlling the clock pulse to the binary counter and a R-input of said flip-flop is connected to the reset-line of the binary counter, a signal is input to an output disable of the memory means upon the output Q being simultaneous with the output of the photo-electric switching circuit corresponding the R/W line.

15. A sequence control system according to claim 1 in which said gate means includes an emergency detecting circuit comprising a photo-coupler connected to the system source through a pull-up resistor, the collector of the photo-transistor of the photo-coupler is coupled to a gate for controlling the clock pulse to the binary counter, the emitter of the photo-transistor is connected to the ground, a light-emitting diode of the photo-coupler is coupled to an emergency detector through a connector.

16. A sequence control system according to claim 1 in which said gate means includes the one-shot pulse generating circuit of which output line is connected to negative side of a connector 17, the positive side of said connector is connected to the system source $V_B$, said connector is adapted to be connected to a connector 18 of another sequence control system.

17. A sequence control system according to claim 1 in which said gate means includes a-input of a 2-input NOR gate 116 is connected to b-input of a 2-input NOR gate 72 and b-input of the 2-input NOR gate 116 is connected to an output of the power-failure detective circuit, output of the gate is connected to a negative side of a connector 16 and a positive side of the connector is connected to the system source $V_B$ through a resistor said connector is adapted to be connected to a connector 15 of another sequence controller thereby to provide an emergency circuit in the case of coupling a plurality of the sequence control systems.

18. A sequence control system according to claim 1 in which said gate means includes a remote control circuit and a power-failure detective circuit, the base and emitter of the transistor of said power-failure detective circuit are coupled to poles of an outside stop switch 107 through a connector 19, the poles of a start switch 10 are connected to poles of an outside start switch 108 through a connector 20.

19. A sequence control system according to claim 1 in which memory means is a C-MOS RAM of which input and output for data are independently separated.

20. A sequence control system according to claim 19 in which said memory means is a C-MOS RAM, address lines of the C-MOS RAM are connected corresponding address lines of the binary counter, R/W input of the memory is connected to the binary counter through an one-shot pulse generating circuit, a gate 64 for controlling a write cycle or a read cycle, delay circuit and the output disable (OD) of the C-MOS RAM is connected to the output of the 2-input NAND gate 65, a chip-enable (CE2 is connected to output of the second flip-flop, a chip-enable (CE1) is connected to the ground, data input bus lines are connected to output lines of light-receiving element corresponding on data lines, data output bus lines are connected to output lines for controlling loads.

21. A sequence control system according to claim 1 in which the memory means is a C-MOS RAM provided with a common input/output.

22. A sequence control system according to claim 21 in which address lines of the memory means are connected to corresponding address lines of the binary counter, R/W input of said memory is connected to the binary counter through an one-shot pulse generating circuit, a gate 64 for controlling a write cycle or a read cycle and a differentiate circuit 75' and an output disable (OD) is connected to output of a gate 65 and a chip-enable (CE2) is connected to output of the differentiate circuit 75', a chip-enable (CE1) is connected to output (Q) line of a second flip-flop, data input/output is connected to outputs of light-receiving elements correspond on data lines through 3-state buffer and connected to output lines for controlling the load through 3-state buffer, disable lines for controlling data inputs are connected to the R/W terminal of the C-MOS RAM 120, and disable lines for controlling data outputs are connected to the output of the 2-input NAND gate 127.

23. A sequence control system according to claim 1 in which said gate means includes a clock pulse controlling gate 73' inputs of said gate comprises an output of the one cycle end circuit, output of the power-failure circuit, an emergency detective circuit, respectively. And the output of the gate is connected to carry-in of the up/down counter.

24. A sequence control system according to claim 23 in which the output of said clock pulse generating gate is connected to a chip-enable of the memory means.

* * * * *